(12) United States Patent
Gray et al.

(10) Patent No.: US 11,908,297 B1
(45) Date of Patent: *Feb. 20, 2024

(54) SYSTEMS AND METHODS FOR CONFIRMING PROPERTY SERVICES

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Qunying Kou, San Antonio, TX (US); Ashley Raine Philbrick, San Antonio, TX (US); Thomas Wayne Schwarz, Jr., Helotes, TX (US); Snehal Desai, Richardson, TX (US); Nolan Serrao, Plano, TX (US); Jeanie Graciela Lopez, San Antonio, TX (US); Jennifer Hunt Erickson, San Antonio, TX (US); Bharat Prasad, San Antonio, TX (US); Yevgeniy Viatcheslavovich Khmelev, San Antonio, TX (US); Joel S. Hartshorn, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/365,799

(22) Filed: Jul. 1, 2021

Related U.S. Application Data

(63) Continuation of application No. 16/828,683, filed on Mar. 24, 2020, now Pat. No. 11,055,978.

(51) Int. Cl.
*G08B 13/24* (2006.01)
*G06Q 50/16* (2012.01)
*G06Q 10/20* (2023.01)

(52) U.S. Cl.
CPC ......... *G08B 13/2494* (2013.01); *G06Q 10/20* (2013.01); *G06Q 50/163* (2013.01)

(58) Field of Classification Search
CPC ... G08B 13/2494; G06Q 10/20; G06Q 50/163
(Continued)

(56) References Cited

U.S. PATENT DOCUMENTS

| 7,486,948 | B1 | 2/2009 | Vergon |
| 11,055,978 | B1 * | 7/2021 | Gray ............... G06Q 10/20 |

(Continued)

FOREIGN PATENT DOCUMENTS

CN      114529024 A  *  5/2022

*Primary Examiner* — Fekadeselassie Girma
(74) *Attorney, Agent, or Firm* — Fletcher Yoder, P.C.

(57) ABSTRACT

A system may include a processor. The processor may be configured to receive a first indication indicative of presence of a person arriving at a location associated with a scheduled service. The process may also be configured to determine whether the first indication corresponds to an expected arrival time of the scheduled service. Additionally, the processor may receive activity data in response to determining that the indication corresponds to the expected arrival (Continued)

time. Further, the processor may receive a second indication indicative that the person has completed the scheduled service. Further still, the processor may determine whether the scheduled service is completed based at least in part on the activity data. Even further, the processor may transmit a service confirmation to a computing device associated with a property owner of the location in response to determining that the scheduled service is completed.

17 Claims, 4 Drawing Sheets

Related U.S. Application Data

(60) Provisional application No. 62/826,527, filed on Mar. 29, 2019.

(58) Field of Classification Search
USPC .......................................................... 340/541
See application file for complete search history.

(56) References Cited

U.S. PATENT DOCUMENTS

| | | | |
|---|---|---|---|
| 11,768,978 B1* | 9/2023 | Gray | G06F 30/20 703/6 |
| 2014/0014008 A1* | 1/2014 | Tompkins | E05G 1/02 109/23 |
| 2016/0117646 A1 | 4/2016 | Lerick et al. | |
| 2020/0242677 A1 | 7/2020 | Popli et al. | |
| 2023/0096960 A1* | 3/2023 | Maeda | G06Q 10/20 705/305 |

* cited by examiner

SYSTEMS AND METHODS FOR CONFIRMING PROPERTY SERVICES

CROSS-REFERENCE TO RELATED APPLICATION

This application is a continuation of U.S. Non-Provisional patent application Ser. No. 16/828,683, titled "Systems and Methods for Confirming Property Services," which was filed on Mar. 24, 2020, which is related to, and claims priority to, U.S. Provisional Patent Application Ser. No. 62/826,527, titled "Systems and Methods for Confirming Property Services," which was filed on Mar. 29, 2019, and which is herein incorporated by reference in its entirety for all purposes.

BACKGROUND

The present disclosure relates generally to confirmation of services performed on or inside a property. More specifically, the present disclosure relates to using data to inform and/or automate decisions related to the confirmation of services that were performed at or inside the property.

A property owner and/or manager may hire a service person to perform a variety of services on property such as general maintenance, including landscaping, repairs, cleaning, and the like. Confirming that the services are completed and handling the payment can be inefficient as the property owner may not be able to, for example, properly confirm that the service is completed in a timely manner. It is now recognized that improved systems and methods for confirming services may improve the efficiency in which the services may be performed.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system having a processor. The system also includes a tangible, non-transitory, computer readable medium, comprising instructions that cause the processor to perform operations. The operations include receiving a first indication indicative of presence of a person arriving at a location associated with a scheduled service. The operations also include determining whether the first indication corresponds to an expected arrival time of the scheduled service. Additionally, the operations include receiving activity data associated with the scheduled service in response to determining that the first indication corresponds to the expected arrival time. Further, the operations include receiving a second indication indicative that the person has completed the scheduled service. Further still, the operations include determining whether the schedule service is completed based at least in part on the activity data. Even further, the operations include transmitting a service confirmation to a computing device associated with a property owner of the location in response to determining that the scheduled service is completed.

In another embodiment, the present disclosure relates to a tangible, non-transitory, computer readable medium, comprising instructions that, when executed by a processor, cause the processor to perform operations. The operations include receiving an indication indicative of a person arriving for a scheduled service. The operations also include outputting a control signal that causes one or more sensors to acquire activity data regarding a location associated with the scheduled service. Additionally, the operations include determining that the activity data is indicative that the person has completed the scheduled service with the location. Further, the operations include transmitting a service confirmation to a computing device associated with a property owner of the location in response to determining that the scheduled service is completed.

In another embodiment, the present disclosure relates to a method. The method includes receiving, via a processor, an indication indicative of presence of a person arriving at a location associated with a scheduled service. The method also includes determining, via the processor, whether the indication corresponds to the scheduled service. Additionally, the method includes transmitting, via the processor, a control signal that causes one or more sensors to acquire activity data that corresponds to a plurality of areas associated with the scheduled service within the location in response to determining that the indication corresponds to the scheduled service. Further, the method includes determining, via the processor, that the activity data is indicative that the person has completed the scheduled service within one or more areas of the plurality of areas. Further still, the method includes transmitting, via the processor, a service confirmation to a computing device associated with a property owner of the location in response to determining that the scheduled service is completed in the one or more areas of the plurality of areas.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, a user (e.g., a property owner and/or manager) may hire a service person to perform a variety of services on or within their properties, such as general maintenance, repairs, cleaning, activities (e.g., walking and feeding pets, taking out trash, and the like), and so forth. In some instances, it can be difficult for the user to properly oversee that the service has been completed and/or completed in a timely manner. For example, the user may not be present at the property when the service person arrives or may not be able to monitor the work of the service person as they perform the service. Additionally, service confirmation may be inefficient for service persons as inspection and/or payment by the user and/or individuals may require that each party find overlap between their respective schedules. As such, confirming that services are performed can be an inefficient process for both the property owner and the service person. Accordingly, the present disclosure is directed to a service confirmation system that improves the efficiency of confirming and handling service transactions with minimal interaction between users and service persons.

Figure 1:
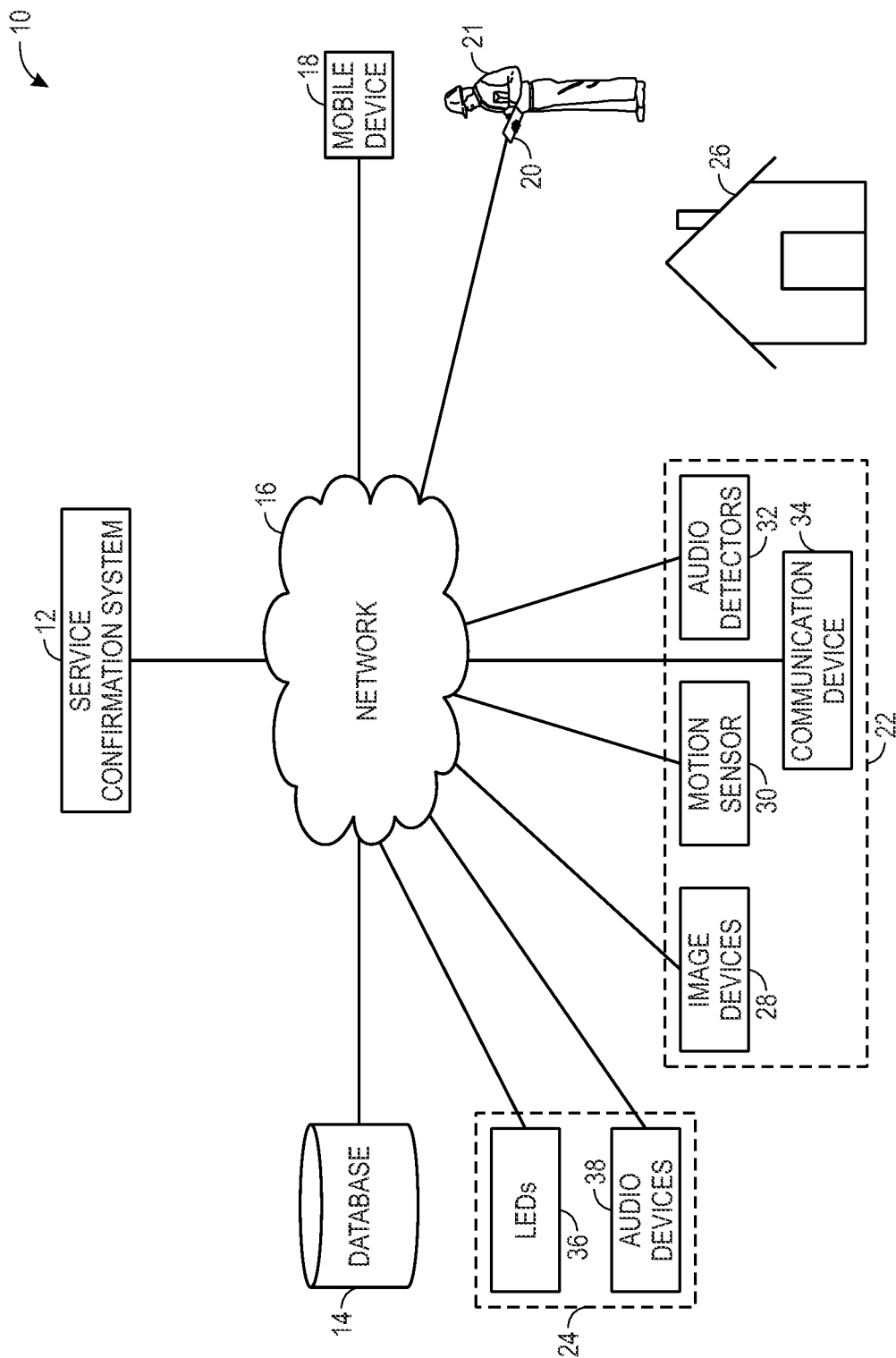
FIG. 1 illustrates a block diagram of a service confirmation network that includes a number of devices and sensors communicatively coupled to a network, in accordance with embodiments described herein.

By way of introduction, FIG. 1 is a block diagram of a system 10 that includes a service confirmation system 12, one or more databases 14, a network 16, a computing device 18, a mobile computing device 20, sensors 22, smart home devices 24, and the like. In general, the service confirmation system 12 may confirm that services are performed, reject an indication that services were performed, handle payments, and/or alert a user of various circumstances that may arise during a service being performed on one or more properties 26, such as commercial buildings, residential buildings, plots of land, and the like. Although the service confirmation system 12 is illustrated as being coupled to the various components depicted in FIG. 1, it should be noted that the service confirmation system 12 may be communicatively coupled to a variety of data sources that may assist the service confirmation system 12 in performing the embodiments described herein. The service confirmation system 12 may include any suitable computer device, such as a general-purpose personal computer, a laptop computer, a tablet computer, a mobile computer, a smart phone device, a server, a cloud-computing system, and the like that is configured in accordance with present embodiments. Additional details with regard to example components that may be part of the service confirmation system 12 is described below with reference to FIG. 2.

The computing device 18 is generally an electronic device worn, held, or associated with the property owner that may be used to send and receive data and/or receive inputs from the property owner. For example, the computing device 18 may be a personal computer, laptop computer, tablet computer, smart phone, and so. Similarly, the mobile computing device 20 is an electronic device worn, held, or associated with the service person 21 that may be used to send and receive data. For example, the mobile computing device 20 may be a personal computer, laptop computer, tablet computer, smart phone, and so.

The sensors 22 generally include devices that may generate, acquire, and/or receive data (e.g., image data, audio data, electronic data, and the like), such as an imaging device 28 (e.g., camera, video recording device, and the like), motion sensors 30, audio detectors 32 (e.g., microphones, voice communication devices, and the like), and reader devices 34 (e.g., RFID devices, barcode scanners, QR code scanners, devices capable of communicating via Bluetooth, radio-frequency, local area networks (LANs), wide area networks (WANs), wireless WANs (WWANs), wireless LANs (WLANs), mobile communications networks (e.g., 3G, 4G, Edge, and the like), and the so forth. Additionally, the sensors 22 may include power sensors, water sensors, water pressure sensors, air pressure sensors, temperature sensors, and the like that may acquire data indicative of a type of service. For example, water pressure sensors may be utilized when the scheduled service uses water (e.g., cleaning, watering plants, washing, etc.) As another non-limiting example, a power sensor may acquire data indicative of certain tools, appliances, and the like being used in certain areas of the property 26 that may provide an indication of a service being performed.

The smart home devices 24 may include any device that may be used to provide an indication to the service person 21 performing maintenance on a home. For example, the smart home devices 24 may include light sources 36 (e.g., light emitting diodes (LEDs), and other suitable illumination devices), audio devices 38 (e.g., voice communication devices, speakers, and the like), display devices (e.g., a CRT (cathode ray tube) or LCD (liquid crystal display) monitor, for displaying information to the user), haptic devices, and the like. For example, the audio devices 38 may be devices capable of producing a sound to alert the service person 21 that the service person 21 is not permitted to enter a particular area of the property 26. Although the property 26 is illustrated as being separate from the sensors 22 and smart home devices 24, it should be noted that the sensors 22 and/or smart home devices 24 may be disposed inside of a structure associated with the property 26 or outside the structure and communicatively coupled to the service confirmation system 12.

In general operation, the service confirmation system 12 may receive data or documents via the mobile computing device 20, and the sensors 22, to confirm whether a service has been performed. For example, the service confirmation system 12 may acquire a first set of data from the mobile computing device 20 and the sensors 22 indicative of a service person 21 arriving at the property 26. Additionally, the service confirmation system 12 may receive a second set of data (e.g., activity data) that is associated with the type of service being performed. For example, the activity data may be audio data acquired from audio devices 32 when the expected service is lawn mowing or a service that may produce sound that is characteristic of the service. As another non-limiting example, the activity data may be image data acquired by the imaging devices 28 before, after, and during of a location within the property 26 during the scheduled service 26 such as before and after images of a room being repainted. Additionally, the activity data may be acquired from other devices capable of producing data indicative of service, such as pedometers, power sensors, and the like as discussed herein. For example, data acquired by a pedometer worn by a dog may indicate whether or not a scheduled dog walking service was completed. Further, the mobile computing device 20 and sensors 22 may acquire data indicative of the service person 21 finishing the scheduled service. In this way, data acquired by the mobile computing device 20 and the sensors 22 may be used to confirm whether a service person Additionally, the service confirmation system 12 may receive data from the computing device 18 and query the databases 14 or other storage component based on the data to retrieve additional data make a decision, such as service confirmation as discussed herein. For example, the property owner may submit identification data via the computing device 18 that may be used to identify the service person 21. For example, the identification data may be an image of the service person's 21 face, an image of a logo of a company performing the scheduled service, and the like. Additionally, the database 14 may include data associated with the services that may be used by the service confirmation system 12 in comparisons with data acquired from the sensors 22 to determine if a type of service was completed or performed. For example, the database 14 may include time data associated with an average time of completion for a scheduled service (e.g., provided by the company to perform the service, provided as input by additional property owners, and predicted based on similar services performed) that may be used to determine if a measured time of a service is indicative of the service being completed. As another non-limiting example, the database 14 may include sound profile data, such as audio data from vacuum cleaning, lawn mowing, various types of home repair work, and the like, that may be used as a reference compared to audio data acquired from an audio device 32 to determine if a particular type of service was performed. In this manner, the service confirmation system 12 may communicate with the smart home devices 24 and/or mobile devices 20 owned by the property owner and/or manager, the service person 21 performing the service, or both, to facilitate decisions and/or actions related to the service.

With the foregoing in mind, the service confirmation system 12 may be communicatively coupled to a number of components to perform its respective operations. For example, the service confirmation system 12 may be communicatively coupled to the databases 14, the computing devices 18, the mobile computing device 20, the sensors 22, the smart home devices 24, components within or outside the property 26 (e.g., commercial and/or residential location), and the like. The databases 14 may include any suitable database that may collect or store information concerning an individual, an organization, the property 26, or the like. In some embodiments, the databases 14 may include account information related to a number of accounts within one or more financial institutions. The account information may include passwords that provide access to transactions between the financial institutions of the property owner and/or manager and the service person 21 performing the service.

In addition to the information listed above for the account data, the databases 14 may also include a collection of documents or information that are related to a number of individuals, account holders, or the like. By way of example, the database 14 may include data that may be useful in identifying services, such as electronic data, sound data, time data, as discussed further below. As such, the database 14 may provide documents or images that verify that a service person has performed a service on an automobile, home, or other property.

Keeping the foregoing in mind, the service confirmation system 12 may assist users in a number of scenarios. For example, referring to FIG. 1, a user 22 may have scheduled home maintenance, such as lawn care, to be performed by service person 21. In this situation, a property owner and/or manager may wish to confirm that the lawn care is completed and in a timely manner. However, traditional methods for confirming the service is performed may require that the property owner and/or manager be present to inspect the completed lawn care and/or pay the service person 21 without properly confirming whether the lawn care has been completed.

As such, in some embodiments, the property owner and/or manager may communicate with the service confirmation system 12 via the mobile computing device 20 a set of parameters related to the service. Such parameters may include, but are not limited to, a type of service, a scheduled time of service, location data (e.g., GPS coordinates) associated with the property, an estimated time for completion of the service, and the like. In some embodiments, the service confirmation system 12 may communicate the parameters to the service person 21 performing the service via a mobile computing device 20 worn or in possession of the service person 21. Upon arrival and/or completion of the service by the service person 21, the service person 21 may communicate with the service confirmation system 12 and the service confirmation system 12 may communicate with the mobile computing device 20 of the service person 21 and the sensors 22 to receive data indicative of the arrival and/or completion of the service and make determinations based on the received data, such as whether the service person 21 should be paid.

In some embodiments, the service confirmation system 12 may provide an access token to the mobile computing device 20 of the service person 21. As discussed herein, the access token may be a QR code, a barcode, digital certificates, a cipher, tokens, and the like, that may be provided to the mobile computing device 21 that may identify and/or be used to grant access to the property 26 to the service person 21. In some embodiments, the service confirmation system 12 may communicate with the smart home devices 24, which provide instructions and/or guidance (e.g., via text, images, and visual indications) to the service person 21 regarding the service, such as signaling a specific location where the lawn care is needed. For example, the smart home devices 24, such as LEDs, may have a characteristic illumination (e.g., a color, illumination pattern, an on or an off state, and the like) that may indicate (e.g., visually indicate) whether an area (e.g., a room) of the property 26 is the area associated with the requested service. As another non-limiting example, the smart home device 24 may be audio devices that play an audio message, such as a pre-recorded audio message by the property owner, that includes information associated with the request service (e.g., which rooms need the requested service). As a further non-limiting, the smart home devices 24 may be displays (e.g., LED, LCD) having text or a map of the property that indicates where the requested service should be performed. In this manner, the service confirmation system 12 may enable the service person 21 to perform the scheduled service 21 without having to directly interact with the property owner, such as to hear instructions related to the scheduled service, which may increase the efficiency of scheduled services performed on the property 26.

In some embodiments, the imaging devices 28, audio detectors 32, and communication devices 34 may operate based a detected location of a service person 21. For example, if the motion detector 30 detects motion indicative of the service person 21, the imaging device 28, audio detectors 32, and communication devices 34 may operate to acquire activity data.

Figure 2:
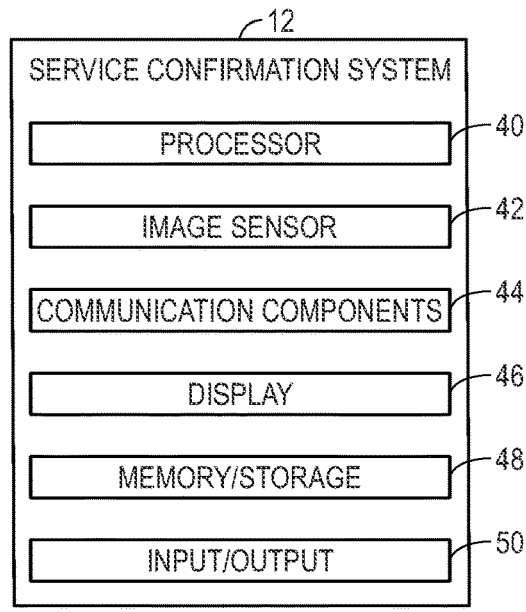
FIG. 2 illustrates a block diagram of a service confirmation system communicatively coupled to the transaction network of FIG. 1, in accordance with embodiments described herein.

To perform one or more operations described herein, the service confirmation system 12 may include various types of components that may assist the service confirmation system 12 in performing the operations described below. For example, as shown in FIG. 2, the service confirmation system 12 may include a processor 40, one or more image sensors 42, a communication component 44, a display 46, memory/storage 48, an input/output (I/O) port 50, and the like.

The processor 40 may be any type of computer processor or microprocessor capable of executing computer-executable code. The processor 40 may also include multiple processors that may perform the operations described below. The image sensor 42 may be a sensor capable of acquiring image data surrounding (e.g., environment) the service confirmation system 12. As such, the image sensor 42 may be a camera or other suitable image capturing device (e.g., scanner).

The communication component 44 may be a wireless or wired communication component that may facilitate communication between the service confirmation system 12, the databases 14, and various other computing systems via the network 16, the Internet, or the like. The display 46 may depict image data acquired by the image sensor 42 and visualizations associated with software or executable code being processed by the processor 40. In one embodiment, the display 46 may be a touch display capable of receiving inputs from a user of the service confirmation system 12. The display 46 may be any suitable type of display, such as a liquid crystal display (LCD), plasma display, or an organic light emitting diode (OLED) display, for example. Additionally, in one embodiment, the display 46 may be provided in conjunction with a touch-sensitive mechanism (e.g., a touch screen) that may function as part of a control interface for the service confirmation system 12.

The memory and the storage 48 may be any suitable articles of manufacture that can serve as media to store processor-executable code, data, or the like. These articles of manufacture may represent computer-readable media (e.g., any suitable form of memory or storage) that may store the processor-executable code used by the processor 40 to perform the presently disclosed techniques. As used herein, applications may include any suitable computer software or program that may be installed onto the service confirmation system 12 and executed by the processor 40. The memory and the storage 48 may represent non-transitory computer-readable media (e.g., any suitable form of memory or storage) that may store the processor-executable code used by the processor 40 to perform various techniques described herein. It should be noted that non-transitory merely indicates that the media is tangible and not a signal. The I/O ports 50 may be interfaces that may couple to other peripheral components such as input devices (e.g., keyboard, mouse), the sensors 22, input/output (I/O) modules, and the like.

In addition to the service confirmation system 12, the mobile computing devices 20, the computing devices 18, as well as other suitable computing devices described herein may include the components described above for the service confirmation system 12. It should be noted that the components described above with regard to the service confirmation system 12 are exemplary components and the service confirmation system 12 may include additional or fewer components than shown.

With the foregoing in mind, the present embodiments described herein may be utilized to facilitate confirmation of services performed by a service person based on data acquired from the sensors 22 disposed on or around property and/or devices utilized by a service person 21 and/or a user requesting the service. For example, the service confirmation system 12 may determine whether a service person has arrived at a property for a requested service in a timely manner. Additionally or alternatively, the service confirmation system 12 may determine whether the service person has completed the requested service based at least in part on data obtained from the sensors 22, computing devices, and/or communication devices that are communicatively coupled to the service confirmation system 12. In some embodiments, an alert may be sent to a device associated with the property owner or suitable person when data does not indicate that the service person arrived to the location and/or completed the service. In some embodiments, the present techniques may guide the service person 21 to an appropriate area within the property 26 to perform the requested service. In this manner, the present techniques provide flexibility to the property owner and service person by reducing interactions between the property owner and service person for guiding the service person 21 to the area to be service, providing access to the service person, and evaluating whether the requested service has been performed.

Figure 3:
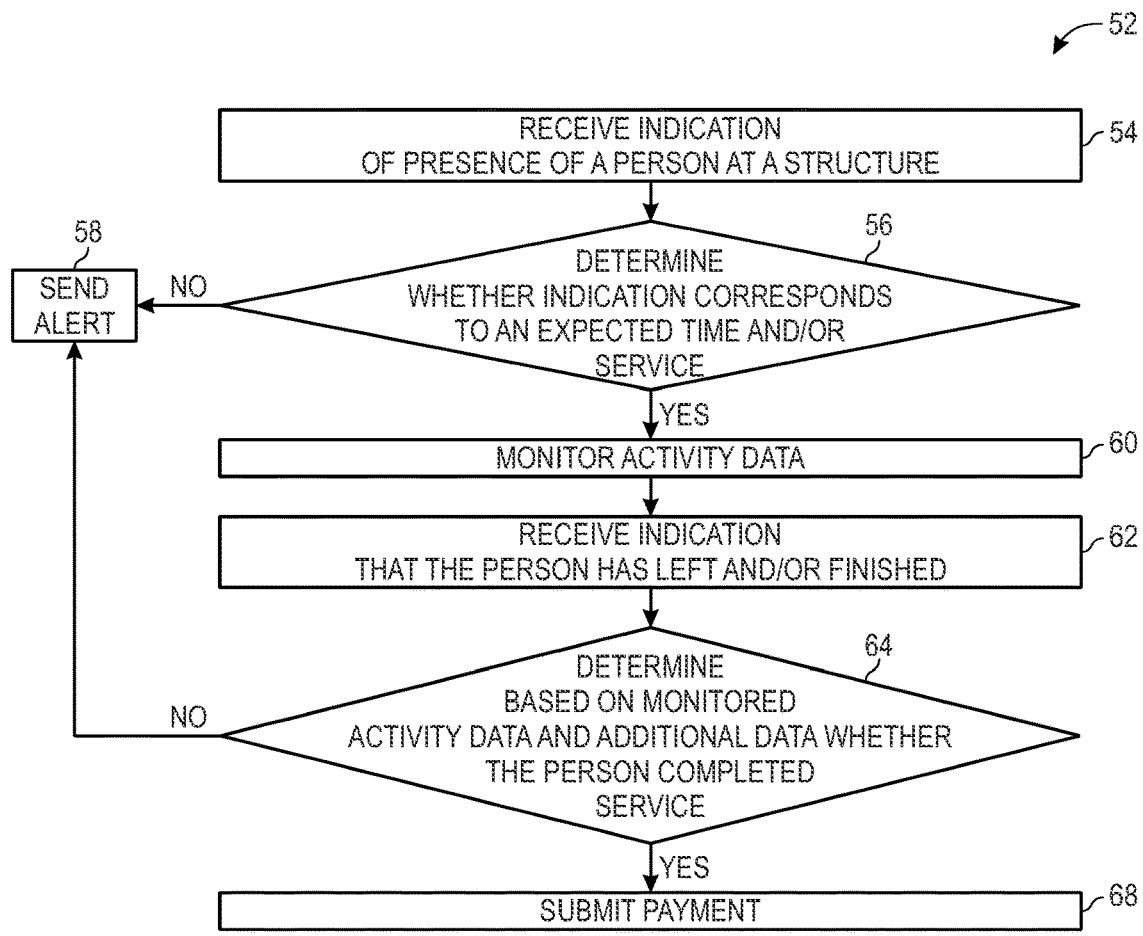
FIG. 3 illustrates a flow chart of a method for determining whether a service is completed using the service confirmation system of FIG. 2, in accordance with embodiments described herein.

FIG. 3 illustrates an example method 52 that may be employed by the service confirmation system 12 to assist a user in managing services. Before proceeding, it should be noted that the method 52 described below is described as being performed by the service confirmation system 12, but the method 52 may be performed by other suitable computing devices. In addition, although the method 52 is described in a particular order, it should be understood that the method 52 may be performed in any suitable order.

Referring now to FIG. 3, at block 54, the service confirmation system 12 may receive an indication indicative of a presence of a person at a property. The indication may be sent by the mobile computing device 20 or any other suitable computing device, one or more of the sensors 22, and/or various components within the property 26. In some embodiments, the indication may be sent as a result of an interaction (e.g., scanning or receiving a QR code, barcode, token, and the like) between the mobile computing device 20 of the service person 21 and the reader device 34 and/or wireless communication with the service confirmation system 12.

In some embodiments, the service confirmation system 12 may send suitable signals (e.g., control signals) to instruct the sensors 22 to acquire data (e.g., audio data, video data, image data, and the like) based on an expected time of the scheduled service. For example, the service confirmation system 12 may instruct the sensors 22 to acquire data continuously and/or within a time window around a scheduled service time (e.g., 5 minutes, 10 minutes, 30 minutes, 1 hour, etc.) In some embodiments, an imaging device (e.g., a camera, video recorder, and the like) may record and image and/or a video of the service person. Additionally, in some embodiments, a time stamp may be included with any of the data mentioned above. In any case, the action performed by the mobile computing device 20 or the data received from the sensors 22 may be used to provide an indication that the service person 21 is present at the property 26.

At block 56, the service confirmation system 12 may determine whether the indication corresponds to an expected time of a service. In some embodiments, the service confirmation system 12 may compare the data received from the sensors 22, components within the property, and/or mobile computing device 20 of the service person 21 with data stored in the database to make the determination. For example, imaging device 28 may receive an image of a uniform or vehicle on the property 26 having a logo, and compare the logo to image data stored in the database (e.g., reference image data) that includes the logo.

If the service confirmation system 12 determines that the indication does not correspond to an expected time of service, a scheduled arrival time of the service, and/or that the service is not related to the expected service, the service confirmation system 12 may proceed to block 58 and instruct the computing device 18 and/or the mobile computing device 20 to send an alert. For example, an image recorded of the service person 21 by an imaging device 28 may not match an image of the service person 21 that is expected to perform the scheduled service. As such, the service confirmation system may instruct the computing device 18 to send an alert. For example, the alert may comprise providing an indication (audio, visual, or both) via the computing device 18 associated with the property owner that an unidentified individual is at the property 26, If the service confirmation system 12 determines that the indication is indicative of the expected service and/or related to the expected service, the service confirmation system 12 may proceed to block 60 and monitor (e.g., acquire, measure) activity data. In general, the activity data may be audio data, image data, and/or motion sensor data acquired by the sensors 22 that may be indicative of the service person 21 performing the service.

For instance, if the service to be performed is lawn care, the activity data may include image data from one or more cameras (e.g., imaging device 28) disposed on an exterior of the property 26 and in a suitable position (e.g., on a side of a house facing an area where the service is expected to occur) to receive the activity data. Additionally, the activity data may be audio data received from audio detectors 32 disposed proximate to the area being serviced. For example, the audio detector 32 may acquire audio data during a lawn mowing service.

In some embodiments, the reader device 34 and/or the service confirmation system 12 may acquire activity data from the mobile computing device 20 or another suitable device 20. For example, the mobile computing device 20 may acquire time data, pedometer data, heart rate data, location data, and the like, that is associated with the service person 21 performing the scheduled service. For example, if the scheduled service is walking a dog, the service confirmation system 12 may receive heart rate data and/or pedometer from the mobile computing device 20 of the service person 21 and/or the dog that may indicate that the service person 21 has taken the dog on a walk.

In some embodiments, the activity data may be an image data of a location in the property 26 that is expected to receive the service that may be acquired by the imaging device 28 and/or the mobile computing device 20, or any suitable device. For example, the service person 21 may record a "before image" with the mobile computing device 20 of an area to be service with the mobile computing device 21 prior to performing a requested service, and an "after image" of the area to be serviced. As such, the service confirmation system 12 may compare the "before image" and the "after image" to determine whether, for example, a room was cleaned based on an absence of certain objects being present in the room.

In some embodiments, the determination that the indication is indicative of the expected service and/or related to the expected service may trigger sensors 22 to operate, and thus, acquire activity data. For example, the imaging device 28 may acquire an image of an area to be serviced that shows a "before image" of a portion of the property 26 before the service person 21 has started working. In some embodiments, the audio device 32 may activate and receive audio data that may be indicative of the sound 78 generated by the lawn mower 80. In some embodiments, the reader device 34 may receive data from the mobile computing device 20 that may include sensors such as a pedometer, heart rate monitor, and the like, which may be indicative of the service person 21 mowing the lawn. In some embodiments, the activity data may be multiple time stamps, such as a first time stamp generated upon the determination at block 56 and a second time stamp generated when the service person 21 provides an indication that the service is completed. In some embodiments, triggering the sensors 22 to operate may include the service confirmation system 12 outputting suitable control signals that cause the sensors 22 to activate and acquire activity data.

At block 62, the service confirmation system 12 may receive an indication that the service person 21 has left and/or finished the service. In some embodiments, the indication may be a change in the activity data. For example, the activity data may be audio data received by the audio devices 32. As such, the indication may be the amplitude of the audio data decreasing below a predetermined threshold. As another non-limiting example, the change in activity data may be a lack of motion detected by motion sensors 30, such as over a predetermined time interval (e.g., 10 minutes, 30 minutes, 1 hour, and so forth).

In some embodiments, the indication that the service person 21 has completed the service may be provided by the mobile computing device 20 and/or the reader device 34 of the service person 21. For example, the service person 21 may interact with the reader device 34 and/or send a message from the mobile computing device 20 that indicates that the service person is leaving and/or done with the service. In some embodiments, the indication may be provided when the mobile computing device 20 loses communication with the reader device 34 as a result of the service person 21 moving outside of a communication range of the reader device 34.

At block 64, the service confirmation system 12 may determine whether the service person 21 completed the service based on the monitored activity data, the indication received at block 62, and, in some embodiments, additional data, such as data stored in a database 14. As discussed above, the activity data may be any combination of data from sensors, such as imaging devices 28, audio devices 32, communication devices 32, and the communication device 20. For example, using image data generated from the imaging devices 28, the service confirmation system 12 may compare a "before image" and an "after image" of an area in the property 26 where the service took place, and make the determination at block 64 based on a similarity or difference between the image data. In some embodiments, if the service confirmation system 12 determines that the service person 21 completed the service based on the monitored activity data, the service confirmation system 12 may output suitable controls to deactivate at least a portion of the sensors 22 (e.g., sensors 22 associated with a location or room where the service person was expected to perform the service.) In some embodiments, if the service confirmation system 12 determines that the service person 21 completed the service, the service confirmation system 12 may output a suitable control signal to the a computing device (e.g., the computing device 18 and/or mobile computing device 20) associated with the property owner that causes the computing device to notify a user that the service is completed, such as by opening an application to notify the user. If the service confirmation system 12 determines that the indication does not correspond to an expected time of service and/or that the service is not related to the expected service, the service confirmation system 12 may proceed to block 58 and send an alert to instruct the computing device 18 and/or the mobile computing device 20.

In some embodiments, the service confirmation system 12 may include interactive components that the user can engage with to obtain additional information about the service being complete (e.g., log of activity data, video data, an arrival time of the service person, a departure time of the service person, and the like). For example, the service confirmation system 12 may display the additional information on a computing device (e.g., the computing device 18 and/or mobile computing device 20) associated with the property owner. In some embodiments, the service confirmation system 12 may transmit the additional information in a common or structured format (e.g., a table format, bulleted summary, activity data versus time plot, and the like) that enables the user to assess whether the service was completed and/or completed with a certain quality.

In some embodiments, the additional information may be transmitted to the computing device of the user as a notification in response to the service confirmation system 12 determining that the service was completed and/or after receiving the indication at block 62. Alternatively, the service confirmation system 12 may also transmit the additional information with the alert when the service confirmation system 12 determines that the service was not completed. This may enable the user to determine the extent to which the service was completed, which may affect an amount paid to the service person 21 or whether the service person is paid. For example, if the user determines that only a portion of the service was completed, the user may provide an input to the service confirmation system 12 that causes the service confirmation system 12 to submit a payment to a bank account associated with service person 21 based on the portion of the service that was completed. Additionally or alternatively, the user may utilize the service confirmation system 12 to schedule a follow-up service by the company associated with the service person 21. At least in some instances, the additional information may be provided to the computing device after block 62 so that the user determine whether the service was completed.

Figure 4:
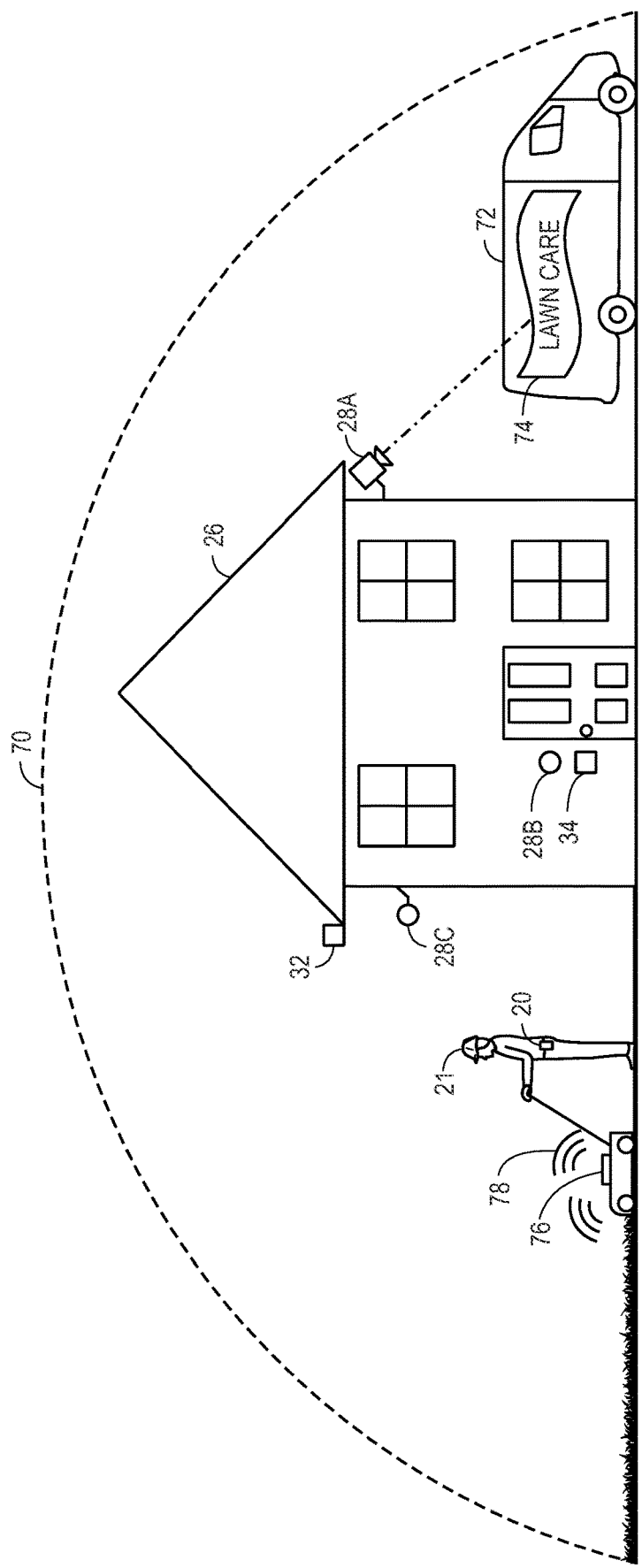
FIG. 4 shows a property having sensors that may acquire data for the service confirmation system of FIG. 2, in accordance with embodiments described herein.

To help illustrate the method 52, FIG. 4 shows an example of service person 21 performing a lawn mowing service on the property 26, in accordance with embodiments of the present disclosure. In the illustrated embodiment shown in FIG. 4, the property 26 includes an imaging device 28 (e.g., camera), audio detector 32, and a reader device 34. The service person 21 is wearing a mobile computing device 20. As discussed herein, the imaging device 28, the audio detector 32, the mobile computing device 20, and the reader device 34 may cooperate to facilitate confirmation of the service (e.g., lawn mowing) being completed.

In the illustrated example shown in FIG. 4, the property 26 includes three imaging devices 28a, 28b, and 28c, an audio device 28c, and a reader device 34. The imaging device 28a acquires image data that includes a logo 74 on a van 72 that may be used to determine whether the service person 21 is associated with the lawn mowing service. As such, the image data acquired by the imaging device 28a may be used to provide an indication that someone has arrived at the property 26. Further, the logo 74 in the image data acquired by the imaging device 28a may be compared to an image stored in the database 14 of a logo associated with a company hired to perform the scheduled service to determine whether the indication is indicative that the service person 21 is associated with the scheduled service.

Additionally, the property 26 includes the imaging device 28b that is disposed on a door of the property 26. The imaging device 28b may acquire image data of the service person 21 (e.g., the face of the service person 21) when the service person 21 approaches the door, or is within a predetermined range of the imaging device 28b. Further, the image of the face of the service person 21 may be used to determine whether the service person 21 is associated with the scheduled service. In this way, the image data acquired by the imaging device 28b may be used to provide an indication that the service person 21 has arrived.

Further, the property 26 includes the imaging device 28c that is disposed on the side of the property 26. In the illustrated example shown in FIG. 4, the imaging device 28c is acquiring image data of the service person performing the lawn mowing service. The image data acquired by the image device 28c may include an image of the uniform 76 (e.g., the hat), which may indicate that the service person 21 is associated with the lawn mowing service. Further, the image data acquired by the imaging device 28c includes the service person 21 using the lawn mower 76. The image data acquired by the imaging device 28c may be compared to an image stored in the database 14 to determine whether lawn mowing is being performed based on, for example, a position of the service person 21, movement by the service person 21 as the service person 21 mows the lawn, and the like.

In the illustrated example shown in FIG. 4, the audio device 32 is acquiring audio data based on the sound waves 78 emitted by the lawn mower 76. As discussed herein, the audio data acquired by the audio device 32 may be used to determine if the service (e.g., lawn mowing) was performed. For example, the service confirmation system 12 may compare the acquired audio data to reference audio data (e.g., stored in memory/storage 48) associated with sound waves expected to be emitted by the lawn mower 76.

Additionally, the indication that the service person 21 has arrived at the property 26 may be sent by the service person 21 via the mobile computing device 20. For example, the service confirmation system 12 may determine whether the service person 21 is at the property based on GPS coordinates, or other data that may be indicative of a location of the service person 21 (e.g., cellular data, WiFi data, RFID data), sent by the mobile computing device 20 (e.g., using geofencing). As such, the indication may be sent manually from the mobile computing device 34 by the service person 21 and the indication may include location data. In another embodiment, the indication may be sent as a result of the service person 21 ringing the doorbell, knocking on the door, or being detected by the imaging device 28b positioned at an entrance into the property 26. For example, the audio device 32 may record audio data based on the sound waves emitted as a result of the service person ringing the doorbell and/or knocking on the door. Further, the service confirmation system 12, may receive the audio data and determine whether the audio data matches reference audio data associated with knocking on the door and/or a volume of the sound waves being above a volume threshold. In some embodiments, ringing a doorbell, knocking on a door, arrival of the vehicle 72, and/or communication between the mobile computing device 20 and the reader device 34 may trigger the imaging device 28b to operate. Additionally or alternatively, the service confirmation system 12 may output suitable control signals that provide the service person 21 access to the property 26, such as unlocking a door, opening a garage door, and the like. It should be noted that any or all of the examples above may be used, and in any combination, to provide the indication to the service confirmation system 12.

Figure 5:
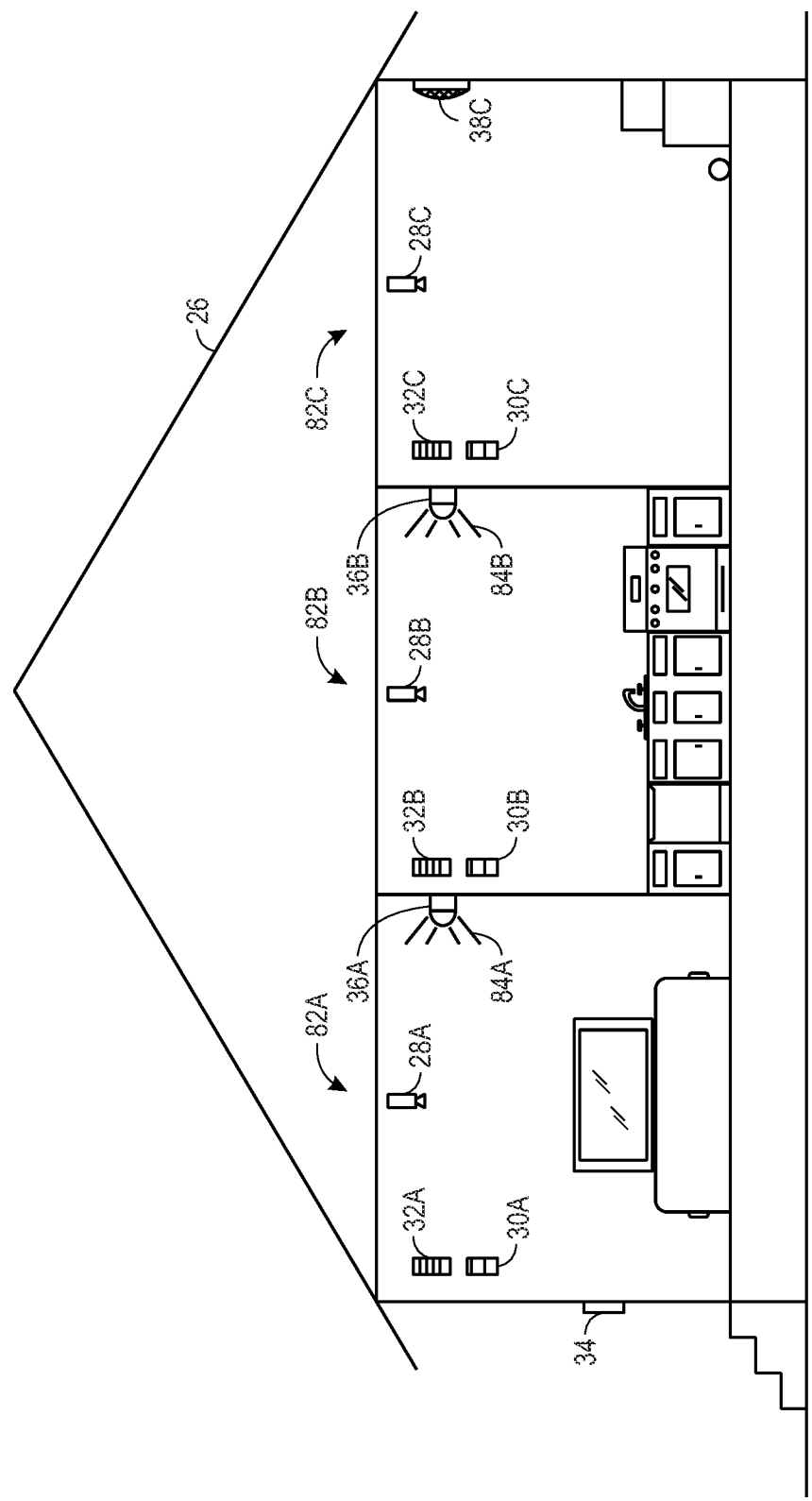
FIG. 5 shows rooms of a property having sensors that may acquire data for the service confirmation system of FIG. 2, in accordance with embodiments described herein.

To further help illustrate the method 52 of FIG. 3, FIG. 5 shows a property 26 having multiple rooms 82 that include imaging devices 28, motion sensors 30, audio detectors 32, communication devices 34, and light emitting diodes (LEDs) 36. In general, as discussed herein, the imaging devices 28, motion sensors 30, audio detectors 32, and reader device 34 operate to detect activity data, which is received by the service confirmation system 12 and used to determine whether the service person has completed the service (e.g., a portion of the service associated one or more of the rooms 82).

As shown in FIG. 5, each of the rooms 82a, 82b, and 82c include a respective imaging device 28, motion sensor 30, and audio detector 32 that may acquire data indicative of a service being performed as well as a presence of the service person 21. That is, the imaging device 28a, the motion sensor 30a, and the audio detector 32a may acquire activity data for the room 82a. Further, the imaging device 28b, the motion sensor 30b, and the audio detector 32b may acquire activity data for the room 82b. Similarly, the imaging device 28c, the motion sensor 30c, and the audio detector 32c may acquire activity data for the room 82c. In this manner, data acquired from the sensors 22 from each room 82a, 82b, and 82c may be used to determine which rooms 82 the service person 21 was present in and if the service person 21 performed the scheduled service.

Additionally, each room 82 includes an LED 36 disposed on a wall of the room 82. As discussed herein, the LED 36 and other smart devices 24 may inform the service person 21 about where to perform the scheduled service, as well as which rooms are off limits. Each LED 82 has a characteristic illumination 84 that indicates whether the service person 21 should enter a room. In particular, the illumination 84c of the LED 82c is illustrated as not being illuminated, indicating that the service person 21 should not enter room 82c. As such, an alert may be sent to the computing device 18 of the property owner if the service person 21 enters the room 82c. Additionally, an alert may be sent to the mobile computing device 20 of the service person 21. In some embodiments, the LED 36 disposed on a wall of each room 82 may be used to indicate an order of which different portions of the expected service are to be performed.

As discussed herein, the present disclosure relates to confirming whether services were performed based on data obtained from sensors, computing devices, and/or communication devices that are communicatively coupled to a service confirmation system. In some embodiments, the sensors, computing devices, and/or communication devices may be used to confirm whether a service person has arrived at the location. In some embodiments, determining whether the service person has arrived may trigger the sensors to acquire certain data related to the service including, but not limited to, distance data, power data, image data, audio data, video data, time data, data indicative of successful communication between devices, or any combination thereof. In this manner, service may be conducted more efficiently based on increased flexibility between scheduling of services and reducing a need for a property owner to inspect a service when it is deemed completed.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor;
a tangible, non-transitory, computer readable medium, comprising instructions that cause the processor to perform operations comprising:
  receiving a first indication indicative of a person arriving at a location;
  determining whether the first indication corresponds to a scheduled service associated with the location;
  transmitting a control signal that causes one or more sensors to acquire activity data in response to determining the first indication corresponds to the scheduled service;
  receiving the activity data associated with the scheduled service subsequent to transmitting the control signal;
  receiving a second indication indicative that the person has completed the scheduled service;
  determining whether the scheduled service is completed based at least in part on the activity data and the second indication; and
  transmitting a service confirmation to a computing device associated with a property owner of the location in response to determining that the scheduled service is completed.

2. The system of claim 1, comprising one or more sensors configured to acquire the first indication, the activity data, the second indication, or any combination thereof.

3. The system of claim 1, wherein determining whether the first indication corresponds to the scheduled service comprises comparing an expected arrival time to a time associated with the first indication.

4. The system of claim 1, wherein the one or more sensors comprise audio sensors, and wherein determining whether the schedule service is completed based at least in part on the activity data is based at least in part on a comparison between the activity data comprising audio data acquired by the audio sensors and a sound profile associated with the scheduled service.

5. The system of claim 1, wherein determining whether the first indication corresponds to the scheduled service associated with the location comprises determining whether the person is associated with the scheduled service.

6. The system of claim 1, wherein the operations comprise transmitting a signal to one or more devices disposed within the location to enable access of the person in response to determining that the first indication corresponds to the scheduled service.

7. The system of claim 1, wherein the activity data comprises power data, time data, audio data, image data, video data, or any combination thereof.

8. A tangible, non-transitory, machine-readable medium comprising instructions that, when executed by a processor, cause the processor to perform operations comprising:
receiving a first indication indicative of a person arriving at a location associated with a scheduled service;
determining whether the first indication corresponds to the scheduled service;
transmitting a control signal that causes one or more sensors associated with the location to acquire activity data in response to determining the first indication corresponds to the scheduled service;
receiving the activity data associated with the scheduled service subsequent to transmitting the control signal;
receiving a second indication that the person has completed the scheduled service;
determining that the activity data is indicative that the person has completed the scheduled service based on the second indication; and
transmitting a service confirmation to a second computing device associated with a property owner of the location in response to determining that the scheduled service is completed.

9. The tangible, non-transitory, machine-readable medium of claim 8, wherein the first indication comprises a detected logo within image data acquired by the one or more sensors.

10. The tangible, non-transitory, machine-readable medium of claim 8, wherein the operations comprise:
transmitting an additional control signal to a door controller whereby, in response to receiving the additional control signal, the door controller unlocks a door.

11. The tangible, non-transitory, machine-readable medium of claim 8, wherein the activity data comprises audio data; and
wherein determining that the activity data is indicative that the person has completed the scheduled service comprises determining that the audio data is below a threshold.

12. The tangible, non-transitory, machine-readable medium of claim 8, wherein the operations comprise:
determining that an identity of the person corresponds to an identity of a service person associated with the scheduled service; and
transmitting a signal to one or more devices disposed within the location to enable access of the person in response to determining that the identity of the person corresponds to the identity of the servicer person associated with the scheduled service.

13. The tangible, non-transitory, machine-readable medium of claim 8, wherein the one or more sensors comprise image sensors, and wherein the operations comprise:
transmitting an additional control signal to cause the one or more image sensors to receive image data in response to receiving the first indication of the person arriving for the scheduled service;
receiving the image data; and
determining that the image data corresponds with the scheduled service based on a comparison of the image data and a stored reference image.

14. A method, comprising:
receiving, via a processor, a first indication indicative of presence of a person arriving at a location associated with a scheduled service;
determining, via the processor, whether the first indication corresponds to the scheduled service;
transmitting, via the processor, a control signal that causes one or more sensors within the location to acquire activity data in response to determining that the first indication corresponds to the scheduled service;
receiving, via the processor, the activity data measured by one or more sensors within the location subsequent to transmitting the control signal;
receiving a second indication that the person has completed the scheduled service;
determining, via the processor, that the activity data is indicative that the person has completed the scheduled service within the location based on the second indication; and
transmitting, via the processor, a service confirmation to a computing device associated with a property owner of the location in response to determining that the scheduled service is completed within the location.

15. The method of claim 14, comprising transmitting, via the processor, an additional control signal to one or more devices disposed located within a proximity of the location to enable access of the person in response to determining that the first indication corresponds to the scheduled service.

16. The method of claim 14, wherein the indication comprises image data associated with the person, a service company associated with the person, or both; and
wherein determining, via the processor, whether the first indication corresponds to the scheduled service comprises comparing the image data to reference image data stored in a database accessible by the processor.

17. The method of claim 14, comprising transmitting, via the processor, a control signal that causes one or more devices to generate an alert indicative of an area that is not associated with the scheduled service.

* * * * *